(12) United States Patent
Lu

(10) Patent No.: US 11,608,716 B2
(45) Date of Patent: Mar. 21, 2023

(54) METHODS AND SYSTEMS FOR CONTROLLING GEYSERING IN MINING

(71) Applicant: HIGHLAND FLUID TECHNOLOGY, Houston, TX (US)

(72) Inventor: Shawn Lu, Katy, TX (US)

(73) Assignee: HIGHLAND FLUID TECHNOLOGY, Houston, TX (US)

( * ) Notice: Subject to any disclaimer, the term of this patent is extended or adjusted under 35 U.S.C. 154(b) by 0 days.

(21) Appl. No.: 17/586,923

(22) Filed: Jan. 28, 2022

(65) Prior Publication Data

US 2022/0259944 A1 Aug. 18, 2022

Related U.S. Application Data

(60) Provisional application No. 63/148,936, filed on Feb. 12, 2021.

(51) Int. Cl.
*E21B 36/00* (2006.01)
*C09K 8/92* (2006.01)

(52) U.S. Cl.
CPC .............. *E21B 36/001* (2013.01); *C09K 8/92* (2013.01); *C09K 2208/28* (2013.01)

(58) Field of Classification Search
CPC ...... E21B 36/001; C09K 8/92; C09K 2208/28
USPC .......................................................... 166/302
See application file for complete search history.

(56) References Cited

U.S. PATENT DOCUMENTS

| | | | | |
|---|---|---|---|---|
| 5,515,924 A | * | 5/1996 | Osterhoudt, III | C09K 8/60 166/309 |
| 6,095,246 A | * | 8/2000 | Gray | E21B 33/134 166/285 |
| 6,220,356 B1 | * | 4/2001 | Spikes | E21B 27/02 166/309 |
| 2003/0010504 A1 | * | 1/2003 | Casey | E21B 33/068 166/70 |

* cited by examiner

*Primary Examiner* — William D Hutton, Jr.
*Assistant Examiner* — Ashish K Varma
(74) *Attorney, Agent, or Firm* — Pierson Intellectual Property LLC

(57) ABSTRACT

Systems and methods for controlling geysering in mining operations.

9 Claims, 5 Drawing Sheets

METHODS AND SYSTEMS FOR CONTROLLING GEYSERING IN MINING

BACKGROUND INFORMATION

Field of the Disclosure

Examples of the present disclosure relate to systems and methods for controlling geysering in mining. More specifically, embodiments are directed towards positioning rods with additives downhole to change the thermal gradient of a water column within the hole to prevent geysering.

Background

Geysering is a physical event where steam and hot water bursts out from the ground. Specifically, gysers are characterized by an intermittent discharge of water ejected turbulently, and accompanied by steam. Geysers are formed based on the hydrogeological conditions in downhole environments. Generally, all geyser Geysers pose safety hazards for mining operations in geothermal areas, such as volcanic calderas. Column of hot water gush out of drilled holes as the ground is hot. As the underground water flow is not controllable, the geyser events are hard to predict or control.

Mining operations can lead to situations that are ripe for geysering. Conventional mining operations can include a heat source that is above 100° C., water source from surface or ground, a vessel or hole for water to accumulate and a ground with low permeability to hold water in the hole. At ambient condition, the heat source boils and evaporates the water.

Further, in the case of drilled holes for mining with a depth of 10 meters or higher, the pressure on the bottom is much higher than the atmosphere condition, which increases the boiling point significantly. In other words, water is still in liquid state when heat to above 100° C., which is called superheated water. When there is a disturbance, such as drainage of water, it results in a sudden reduction in pressure. The reduction in pressure causes the water body to flash to a vapor. The water volume expands over 1000 times when it becomes gaseous. The sudden expansion results in a violent explosive event or called geysering.

Accordingly, needs exist for systems and methods to limit or control geysering situations associated with mining that utilize rods with additives that change the thermal gradient of the water column within a hole, which may improve the safety of the mining operations.

SUMMARY

Embodiments are directed towards changing the thermal gradient of a water column within a drill hole to reduce or prevent geyersing. Embodiments may utilize sticks, rods, or any other element that has a length that is smaller than that of the wellbore. The sticks may be dissolvable over time, be configured to sink within the wellbore, and be configured to deliver additives to the bottom of the wellbore. Embodiments of the sticks may include a shell and additives.

The shell may be formed of water soluable materials, and may be configured to fully dissolve over a predetermined amount of time. In embodiments, the amount of time may be one hour. The shell may be configured to increase the viscosity of the sticks, and thus the rheological and thermal properties. The shell may also be configured to allow the sticks to be heaver than water, allowing the sticks to sink to the bottom of the wellbore, which may be closer to the heat source of the well.

The additives may be configured to increase the viscosity of the sticks over 10,000 times. This may minimize or prevent thermal convention when in contact with the heat source, which may reduce the volume of super-heated water to prevent geysering events.

In embodiments, a hole and ground temperature profile may be created for a wellbore. The profile may be created through modeling and simulations based on temperatures and pressures at various locations throughout the wellbore. After the profile is created, a dosage of additives and a number of sticks needed for the wellbore may be determined. Next, the determined number of sticks with the determined additives may be delivered and dropped into the column of fluid within the wellbore. This may create a viscous or treated portion, which dramatically changes the thermal gradient of the wellbore. Thus, preventing geyersing. More specifically, the determined number of sticks within the determined additives may allow an upper portion of the fluid column within the wellbore to remain cool while a lower portion of the fluid column may reach a boiling temperature.

Embodiments may provide a simple and cost-effective way to minimize or eliminate geysering risks for mining in hot ground applications.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
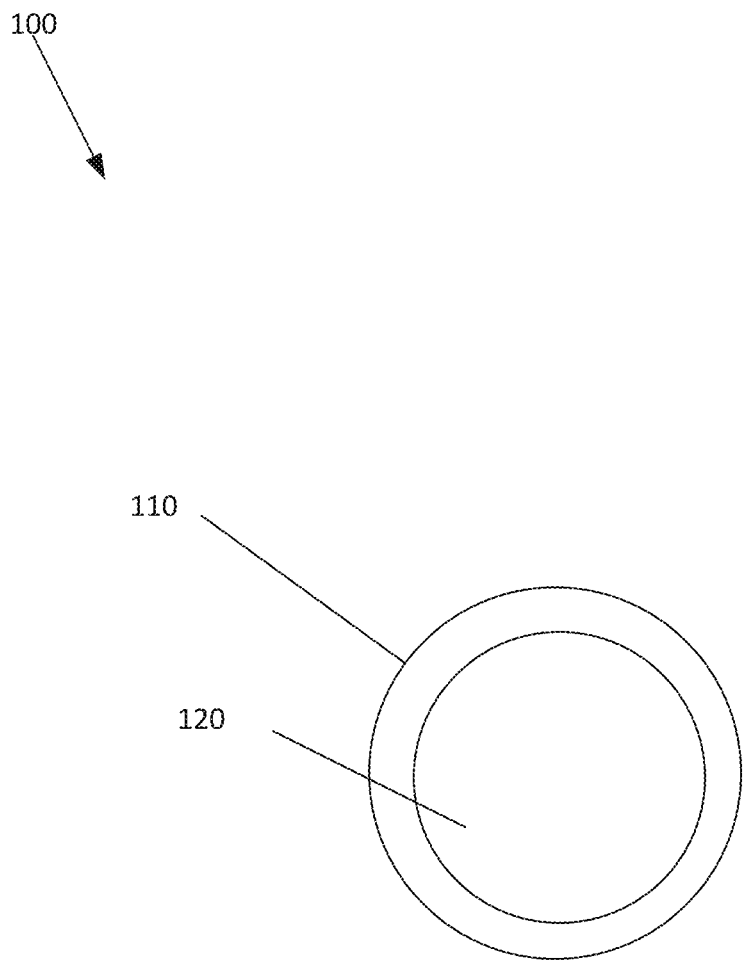
FIG. 1 depicts a stick, rod, cylinder, tube, etc. that is configured to deliver additives that create a fluid that is heavier, more viscous, and has a higher boiling point on the bottom of the hole, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure.

Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a stick 100, rod, cylinder, tube, etc. that is configured to deliver additives that create a fluid that is heavier, more viscous, and has a higher boiling point on the bottom of the hole. This may reduce or eliminate geysering within a wellbore. Stick 100 may include a shell 110 and additives 120.

Shell 110 may be formed of water-soluble materials that are configured to protect and seal the encompassed additives 120 for a predetermined amount of time and/or based on the wellbore environment. For example, shell 110 may be configured to dissolve after one hour depending on the temperature and pressure of the wellbore. In embodiments, while shell 110 is intact, shell 110 may be configured to completely seal and protect additives 120. In embodiments, a diameter of shell 110 may be less than that of the wellbore. For example, shell 110 may be smaller than 2" in diameter. In embodiments, shell 110 may be formed of poly ethylene oxide.

Additives 120 may be positioned within shell 110 before stick 100 is positioned within a wellbore. Additives 120 may be configured to effectively increase the viscosity of fluid, and thus the rheological and thermal properties of fluid within a wellbore. Additives may be configured to increase the viscosity of the fluid over 10,000 times, which may minimize or prevent thermal convention when in contact with a head source. In embodiments, additives 120 may include ethylene glycol or polyols, salt, viscosifer, etc. More specifically, stick 100 may be 50% additives 120 such as, ethylene glycol: 1.088 sg at 4° C., with a Boil point: 107.2° C. at Ambient pressure. Water based polymers may also be used to increase the viscosity of the column of fluid even at higher temperatures. In specific embodiments, for a steel pipe that has a two inch diameter, five inch length, and has a distal end that is set within a heat source having 130° C., a stick 100 that includes 1% additives may eliminate geysering while having water overflowing. However, by adding more fluid to the proximal end of the pipe may further limit the fluid loss. In other embodiments, additives may be can be biopolymers such as Xanthan gum, polyacrylamide type of viscosifiers or other additives that can significantly increase the water viscosity.

Figure 2:
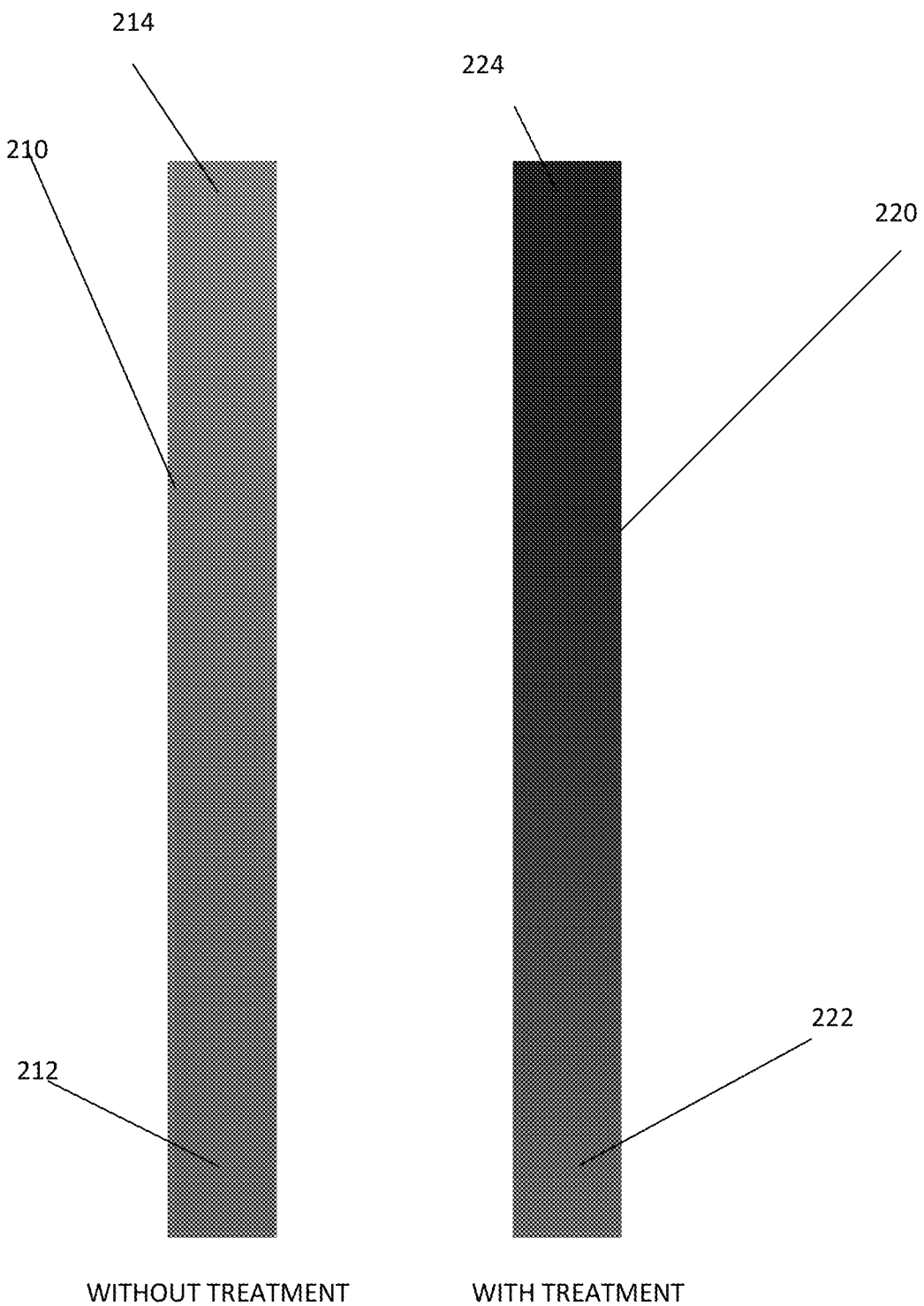
FIG. 2 depicts an embodiment of a first column of fluid that is not treated with sticks and a second column of fluid that is treated with sticks.

FIG. 2 depicts an embodiment of a first column of fluid 210 that is not treated with sticks, and a second column of fluid 220 that is treated with sticks 100.

As depicted in FIG. 2, if there is no treatment of a column of fluid 210 within a wellbore, a heat source positioned close to a distal end 212 of the column of fluid 210 may enable the entirety of the column of fluid 210 to have a substantially uniform temperature profile. The uniform temperature profile may lead to high temperatures from distal end 212 to proximal end 214. More specifically, if a column of fluid 210 is left untreated, there may be a small thermal gradient from distal end 212 to proximal end 214.

FIG. 2 also depicts a treated second column of fluid 220 within a wellbore. A heat source may be positioned close to distal end of 222. When sticks 100 are positioned within the wellbore, sticks 100 may sink to the bottom of the column of fluid 220 without shell 110 dissolving. After a predetermined amount of time, shell 110 may dissolve, exposing additives 120. Additives 120 may interact with the column of fluid 220 at a location close to distal end 222. The interaction may change the thermal gradient of column of fluid 220. Specifically, additives 120 may increase the viscosity of the fluid close to distal end 222, which raises the boiling point of the fluid close to distal end 222. This may reduce the volume of superheated fluid, and prevent geysering events. Furthermore, by changing the thermal gradient, proximal end 224 may include cool temperatures of fluid while distal end 222 reaches a boiling point.

Figure 3:
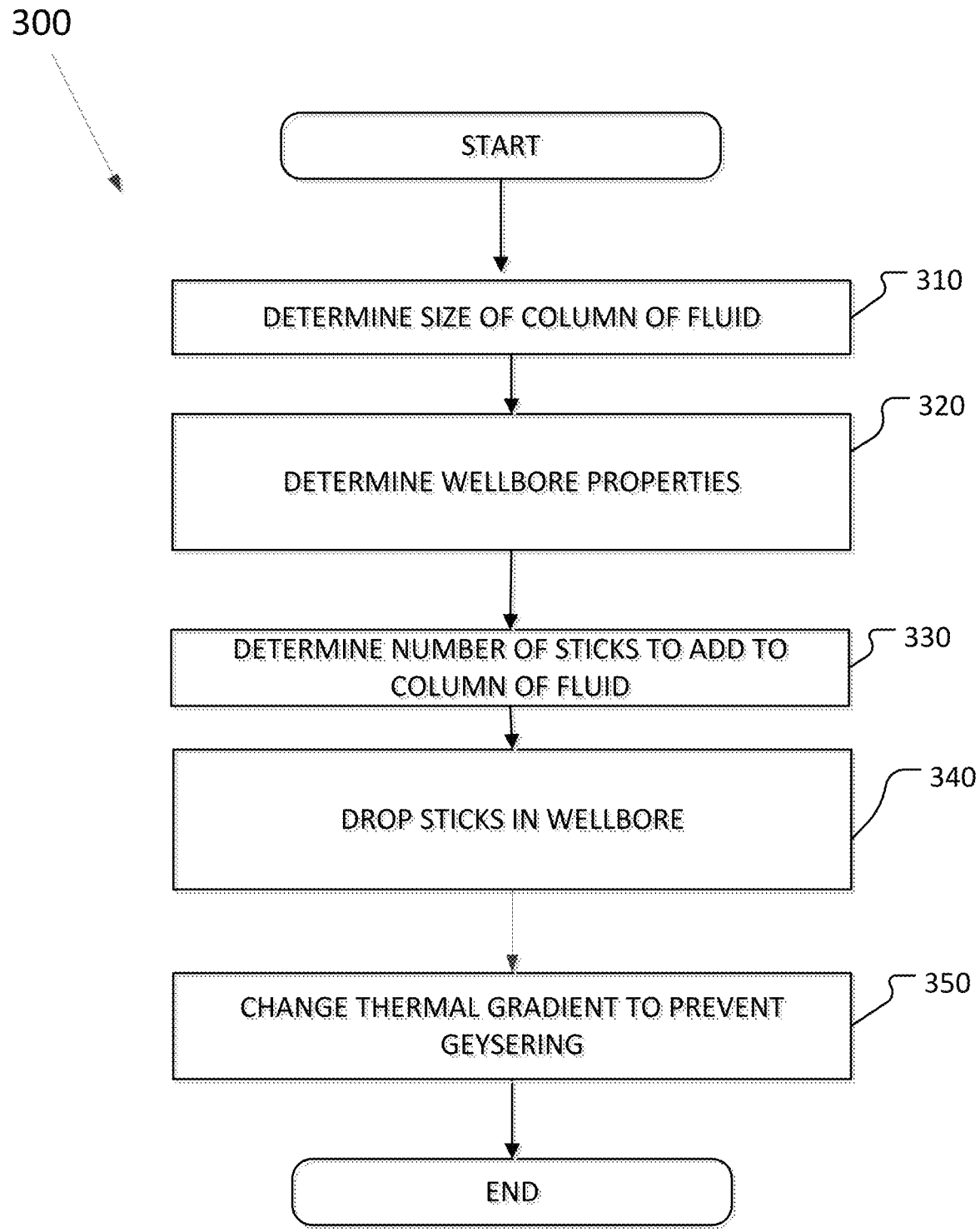
FIG. 3 depicts a method for reducing or eliminating geysering events, according to an embodiment.

FIG. 3 depicts a method 300 for reducing or eliminating geysering events, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

At operation 310, a size of a column of fluid may be determined. The size of the column of fluid may be determined on any known method to determine a wellbore profile, which may determine a volume of the fluid, diameter of the column of fluid, and height of the column of fluid.

At operation 320, a wellbore geothermal profile may be created, wherein the geothermal profile includes a location of a heat source, the amount of heat produced by the heat source, and a thermal gradient of the untreated column of fluid.

At operation 330, a number of sticks to add to the column of fluid may be determined. In embodiments, the number of sticks to add may be determined based on fluid volume in the hole and a target treatment rate. In embodiments, the target treatment rate of the number of sticks may be determined to have about 1% of polymer additive in the water phase, wherein the polymer additive within the sticks is configured to dissolve within 5 to 60 minutes depending on the water temperature. Further, the target treatment rate may be determined such that the polymer additive does not change the boiling point but increases the viscosity, thus the thermal gradient by reducing convective heat transfer.

At operation 340, the determined number of sticks may be dropped or positioned within the column of fluid. Due to the relative weight of the sticks and the column of fluid, the sticks may sink to a bottom of the column of fluid.

At operation 350, a shell associated with the sticks may dissolve after a predetermined amount of time, exposing additives. The additives may change the viscosity of the column of fluid at the bottom of the wellbore, changing the thermal gradient of the column of fluid. This may reduce or prevent geysering.

Figure 4:
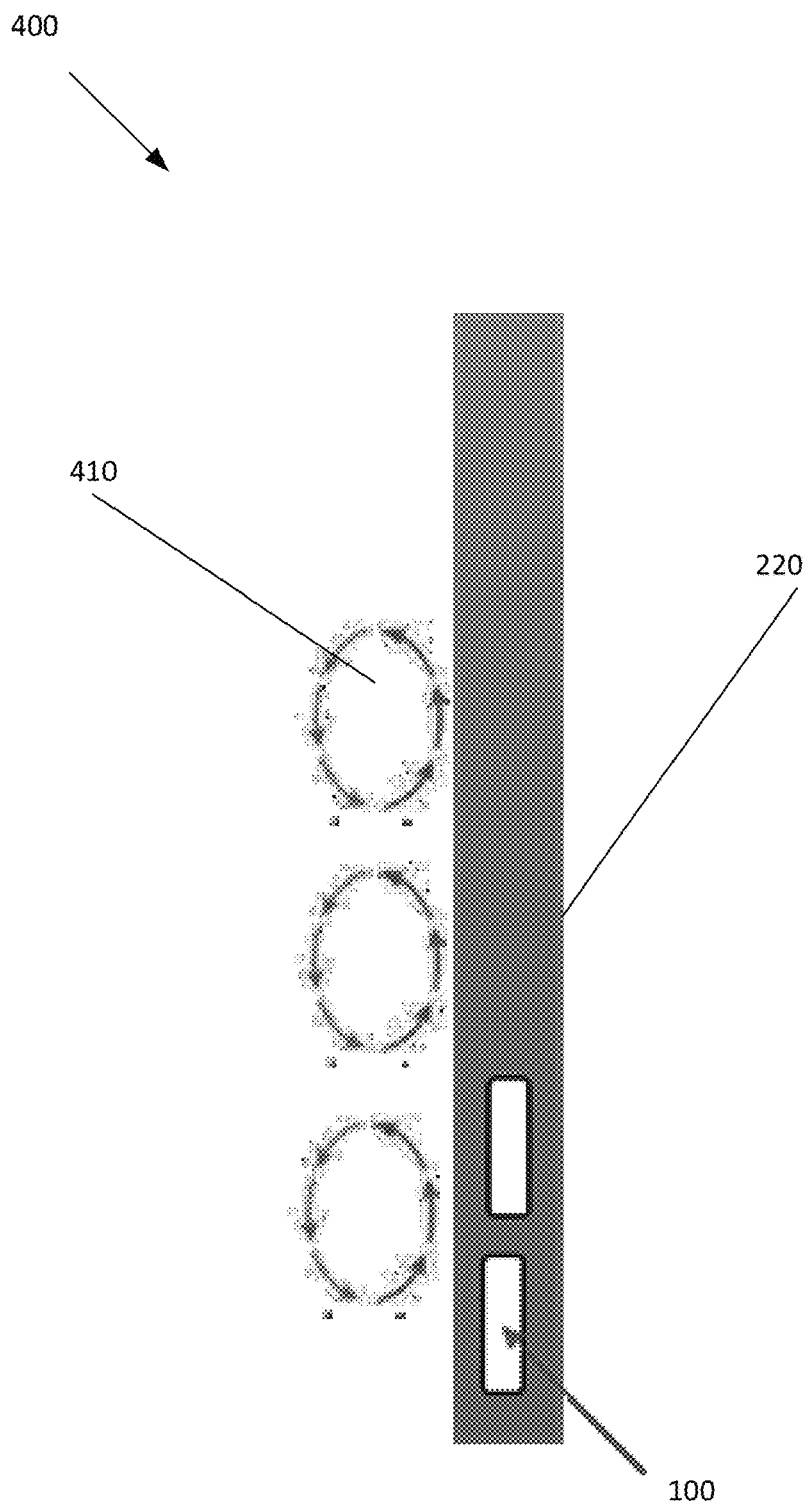
FIG. 4 depicts an embodiment of sticks being positioned within a column of fluid before the shells associated with sticks are dissolved.

FIG. 4 depicts an embodiment of sticks 100 being positioned within a column of fluid 220 before the shells associated with sticks 100 are dissolved. As depicted in FIG. 4, before the shells are dissolved the column of fluid may have a substantially uniform column of fluid.

Figure 5:
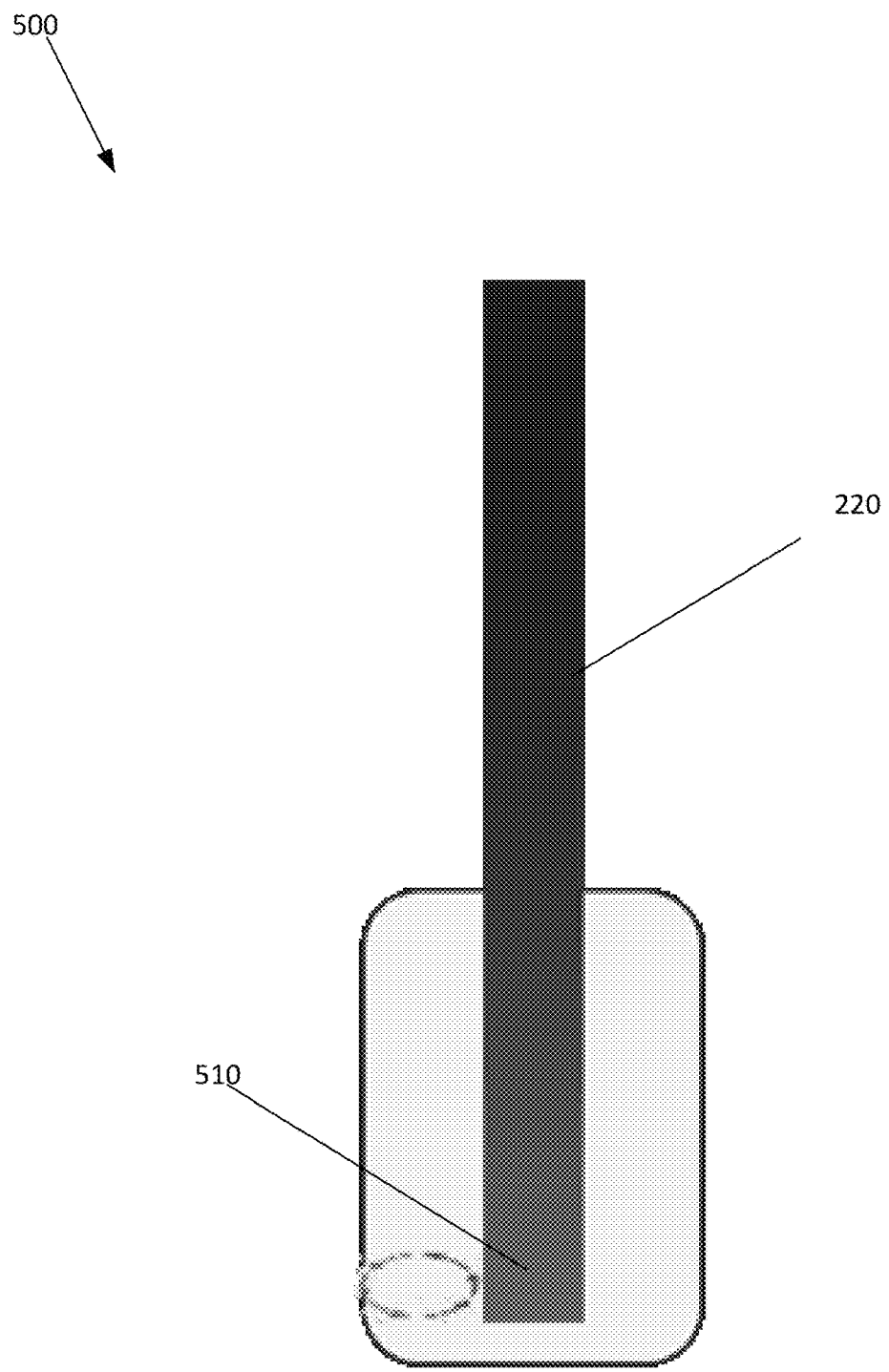
FIG. 5 depicts an embodiment of column of fluid after the shells associated with the sticks are dissolved.

FIG. 5 depicts an embodiment of column of fluid 220 after the shells associated with the sticks 100 are dissolved. As depicted in FIG. 5, the treated portion 510 of the column of fluid may have a much higher viscosity than the other portions of the column of fluid 220. This may lead to a drastically different thermal profile of the column of fluid 220.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for controlling geysering in mining operations, the method comprising:
    determining a profile for a column of fluid, the profile including a volume of fluid within the column of fluid;
    determining a number of sticks to be positioned within the column of fluid, the sticks including a dissolvable shell and additives, wherein the additives increase a viscosity of the fluid within the column of fluid;
    positioning the determined number of sticks within the column of fluid;
    changing the viscosity of fluid at a distal end of the column of fluid by exposing the additives to the fluid at the distal end of the column of fluid, wherein the changing of the viscosity of fluid at the distal end of the column of fluid changes a thermal gradient of the column of fluid by cooling a proximal end of the column of fluid and increasing a temperature of the fluid at the distal end of the column of fluid.

2. The method of claim 1, wherein the dissolvable shell is configured to dissolve after a predetermined amount of time.

3. The method of claim 1, wherein the dissolvable shell is formed of water soluble materials.

4. The method of claim 1, wherein the additives increase the viscosity of the fluid at the distal end of the column of fluid up to ten thousand times.

5. The method of claim 1, wherein the additives reduce the friction during fluid movement over 50%.

6. The method of claim 1, wherein the additives are at least one of biopolymers or polyacrylamide type of viscosifiers.

7. The method of claim 1, wherein the additives increase a boiling point of the fluid at the distal end of the column of fluid.

8. The method of claim 7, wherein the additives are configured to reduce a pressure threshold for bubble expansion of the fluid at a distal end of the column of fluid.

9. The method of claim 1, wherein the changing the viscosity of fluid at a distal end of the column of fluid by exposing the additives prevents geysering within the column of fluid.

* * * * *